June 5, 1934.   G. T. SMITH-CLARKE   1,962,040
TRANSMISSION GEARING
Filed Feb. 17, 1933   2 Sheets-Sheet 1

Inventor:
George Thomas Smith-Clarke,
By Mawhinney & Mawhinney,
Attys.

June 5, 1934.　　G. T. SMITH-CLARKE　　1,962,040
TRANSMISSION GEARING
Filed Feb. 17, 1933　　2 Sheets-Sheet 2

Inventor:
George Thomas Smith-Clarke,
By Mawhinney & Mawhinney,
Attys.

Patented June 5, 1934

1,962,040

UNITED STATES PATENT OFFICE 1,962,040

TRANSMISSION GEARING

George Thomas Smith-Clarke, Coventry, England

Application February 17, 1933, Serial No. 657,303
In Great Britain February 18, 1932

3 Claims. (Cl. 74—260)

This invention relates to transmission gearing particularly for use on motor-vehicles, and its main object is to provide a simple gear mechanism which will not transmit the drive until the rotational speed of the driving shaft increases to a predetermined value, and which will then automatically provide a gear ratio, between the driving and driven shafts, which decreases as the rotative speed of the driven shaft increases, until finally a direct drive is automatically obtained between the two shafts.

Such an arrangement is of particular value in the case of a motor-car starting from rest, as very good acceleration can be obtained.

According to this invention, the transmission gearing comprises a planetary gearing between the driving and the driven shafts adapted, while one element of the gearing is being clutched to the driving shaft, to afford a variable gear ratio, and a centrifugally-actuated clutch device adapted automatically to connect together, with varying degrees of slip, the driving shaft and the said element.

Figure 1:
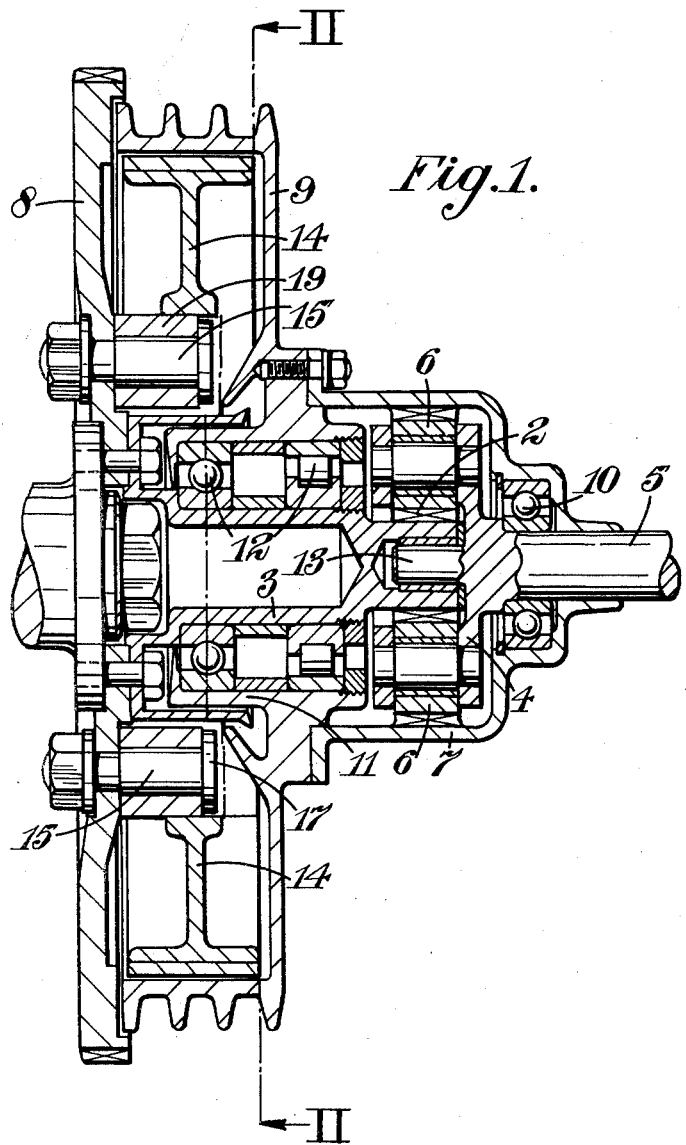
Figure 2:
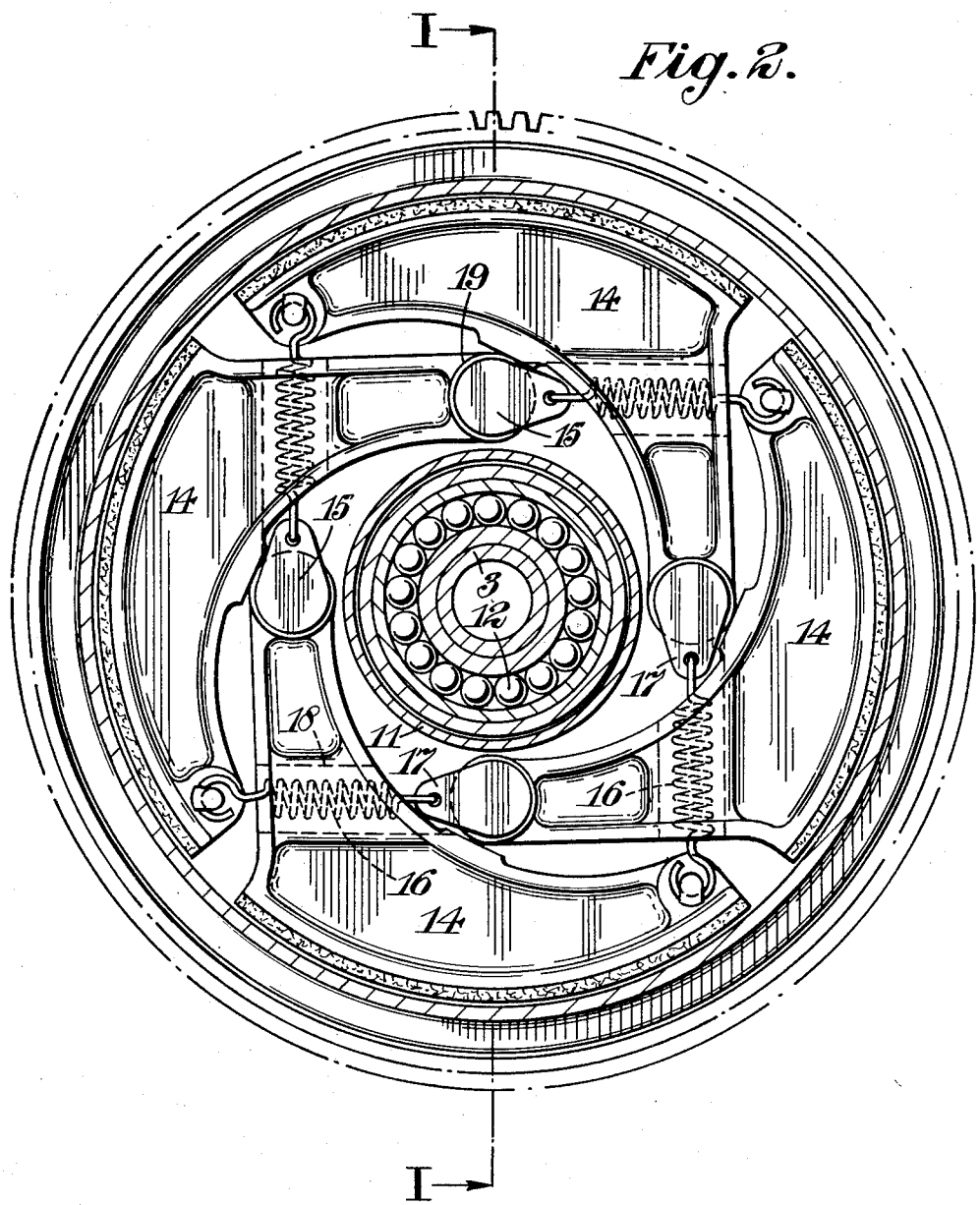

In the accompanying drawings,

Figure 1 is a longitudinal section, taken on the line I—I of Figure 2, through one form of transmission gearing according to the invention, and Figure 2 is a transverse section taken on the line II—II of Figure 1, showing one form of clutch device.

In one simple method of carrying out the invention, as here illustrated, I employ a planetary gearing of which the sun wheel 2 is fast on the driving shaft 3 and the planet pinion carrier 4 is fast on the driven shaft 5, whilst the planet pinions 6, 6 mesh with an internally-toothed annulus 7 which can be free or held stationary relative to the driving shaft. The driving flywheel 8, to which the driving shaft is bolted, carries a centrifugally-acting clutch device adapted to co-operate with the drum 9 to which the annulus is bolted. The latter is journalled on the driven shaft through the ball bearings 10 and the drum is formed with an internal sleeve 11 journalled on the driving shaft by the ball and roller bearings 12, 12, the two shafts having a spigotal connection at 13.

In the drawings the clutch device is shown as comprising four shoes 14, 14 lined with friction material adjacent the drum surface and pivoted at one end on bolts 15, 15 extending transversely through the flywheel. Their free ends are pulled off (towards the centre) by tension springs 16, 16 which are here shown as being anchored to cams 17, 17 on those bolts 15, 15 which are diametrically opposite those on which the respective shoes are pivoted. Each shoe is recessed, as at 18, to receive the spring of an adjacent shoe, and the pivotal boss 19 of each shoe forms an off stop for an adjacent shoe.

In operation, when the driving shaft is running slowly, with the engine idling, and the driven shaft is stationary, the annulus and drum are running in the opposite direction to that of the driving shaft, substantially no torque being applied to the driven shaft in these conditions. If the engine speed (and that of the driving shaft) be materially increased, the centrifugally-acting clutch device comes into operation, the drum and annulus are progressively brought to rest and then rotated in the reverse direction, until they are moving in unison with the driving shaft, when a direct drive is being obtained. During this period, however, the driven shaft is being driven from the driving shaft with a gear ratio which decreases as the rotative speed of the driven shaft increases. The car, in fact, accelerates against the inertia of the moving parts. Finally the clutch engages fully and a direct drive is thus automatically obtained between the driving and driven shafts.

What I claim as my invention and desire to secure by Letters Patent of the United States is:—

1. A gear-ratio clutch for motor vehicles comprising a driving shaft, a driven shaft, an annulus, an operative connection between said driving shaft and annulus for rotating the latter in a direction opposite to the direction of rotation of the driving shaft upon rotation of the driving shaft, centrifugal means on the driving shaft for rotating the annulus in the same direction as the driving shaft upon increased speed of rotation of the driving shaft, said operative connection including a planet pinion on the driven shaft for rotating the latter when the annulus is rotating in the same direction as the driving shaft, said centrifugal means including brake shoes pivoted at one end to the driving shaft and springs interconnecting their other ends with other of the pivots for biasing the shoes to inoperative position.

2. A gear-ratio clutch for motor vehicles comprising a driving shaft, a driven shaft, an annulus, an operative connection between said driving shaft and annulus for rotating the latter in a direction opposite to the direction of rotation of the driving shaft upon rotation of the driving shaft, centrifugal means on the driving shaft for rotating the annulus in the same direction as the driving shaft upon increased speed of rotation of the driving shaft, said operative connection including a planet pinion on the driven shaft for rotating the latter when the annulus is rotating in the same direction as the driving shaft, said centrifugal means including brake shoes pivoted at one end to the driving shaft and springs interconnecting their other ends with other of the pivots for biasing the shoes to inoperative position, the pivot of one shoe providing a stop for an adjacent shoe.

3. A gear-ratio clutch for motor vehicles comprising a driving shaft, a driven shaft, an annulus, an operative connection between said driving shaft and annulus for rotating the latter in a direction opposite to the direction of rotation of the driving shaft upon rotation of the driving shaft, centrifugal means on the driving shaft for rotating the annulus in the same direction as the driving shaft upon increased speed of rotation of the driving shaft, said operative connection including a planet pinion on the driven shaft for rotating the latter when the annulus is rotating in the same direction as the driving shaft, said centrifugal means including brake shoes pivoted at one end to the driving shaft and springs interconnecting their other ends with other of the pivots for biasing the shoes to inoperative position, each shoe being recessed to receive a spring associated with another shoe.

GEORGE THOMAS SMITH-CLARKE.